D. P. SULOUFF.
Mill-Feeding Apparatus.

No. 199,877. Patented Jan. 29, 1878.

WITNESSES:
W. W. Hollingsworth
Colon C. Kernon

INVENTOR:
D. P. Sulouff
BY
ATTORNEYS.

UNITED STATES PATENT OFFICE.

DAVID P. SULOUFF, OF MIFFLINTOWN, PENNSYLVANIA.

IMPROVEMENT IN MILL-FEEDING APPARATUS.

Specification forming part of Letters Patent No. 199,877, dated January 29, 1878; application filed November 20, 1877.

*To all whom it may concern:*

Be it known that I, DAVID P. SULOUFF, of Mifflintown, in the county of Juniata and State of Pennsylvania, have invented a new and Improved Mill-Feeding Apparatus; and I do hereby declare that the following is a full, clear, and exact description of the same.

My invention relates to an apparatus by which grain or grain product is agitated in the hopper, and fed downward into the eye of the runner through a tube by means of a spirally-flanged shaft, and then discharged laterally at the bottom of said tube by a ribbed revolving cone.

Figure 1:
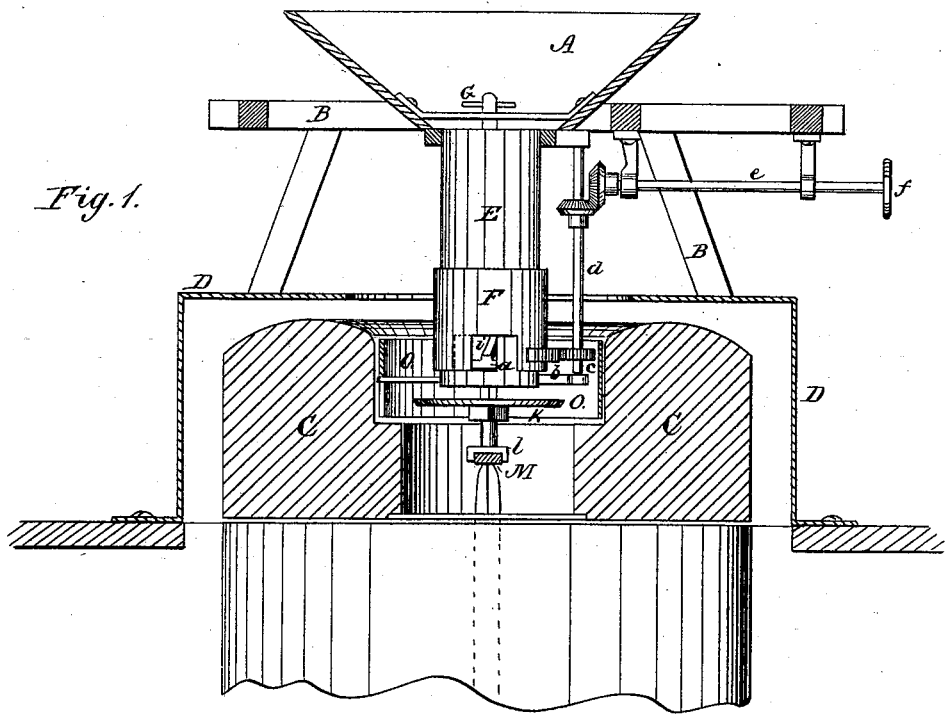
Figure 2:
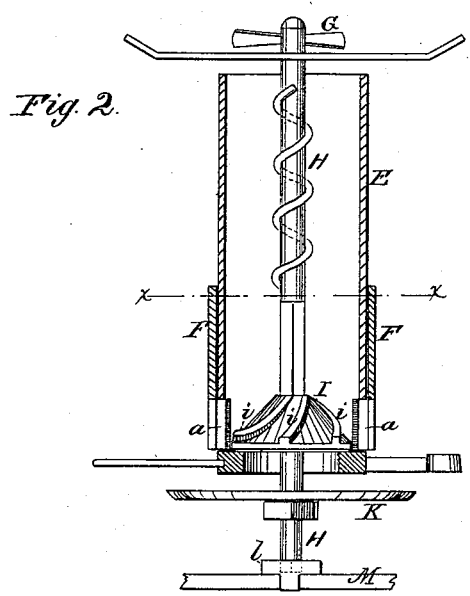
Figure 3:
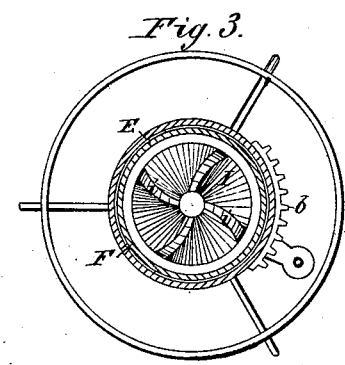
Figure 4:

In the accompanying drawings, forming part of this specification, Figure 1 is a partly sectional elevation of my improved apparatus. Fig. 2 is a sectional elevation of the feed apparatus. Fig. 3 is a cross-section on line $x\ x$, Fig. 2. Fig. 4 shows an elevation of a fragment of the feed-shaft provided with hooks or curved teeth for feeding fine stuff.

The hopper A is supported upon a trestle, B, and the runner C inclosed by a casing or curb, D, in the usual way. The grain or grain product to be ground is conducted from the hopper A into the eye of the runner C by means of a tube, E, having lateral openings $a$ at the lower end, through which the grain discharges. The discharge is regulated by a sleeve, F, which is circumferentially adjustable, and is provided with openings corresponding to those in the feed-tube E.

By adjusting the sleeve F the openings in it and the feed-tube are caused to register more or less perfectly, and the discharge of grain through them will be correspondingly more or less rapid.

The means for effecting the desired adjustment of the sleeve are the rack $b$, pinion $c$, and connected shafts $d$ and $e$, the latter extending laterally from the feed-tube and having a hand-wheel, $f$, applied thereto, as shown.

The grain or grain product in the hopper is agitated by radial rotating arms G, and fed downward in the tube E by a "damsel" or spirally-flanged shaft, H. The arms G are fixed on the upper end of said shaft, and revolve with it. A cone, I, having spiral ribs $i$, constitutes the base of the shaft H, and is located opposite the lateral openings $a$ in the feed-tube.

The ribs $i$ on the cone I incline in a direction opposite to that in which the shaft H revolves, to cause them to move or throw the grain outward, and thus assist its discharge from the feed-tube.

The cone I is located just above a plate or disk, K, which is secured upon the lower end of the shaft H. The shaft is stepped in a detachable socket, $l$, which is mounted on the balance-rynd M.

From the foregoing description it will be obvious that the rotation of the stirrer, damsel, and feed-cone corresponds with that of the runner C, with which they are detachably connected through the medium of the socket $l$, and that grain, bran, or other grain product placed in the hopper A will be stirred or agitated by the revolving arms G, fed downward in the tube E by means of the spiral-flanged damsel or shaft H, and forced out of the openings $a$ in the tube by the spirally-ribbed cone I, the rapidity of the exit or discharge being governed, as before stated, by the circumferential adjustment of the apertured sleeve F.

In addition to the spiral flange of the shaft H, I propose to employ curved spikes or teeth $m$, Fig. 4, to assist in feeding middlings, which, being fine, tend to pack in the tube E.

O is an annular case or large tube suspended from the feed-tube, and extending well down in the eye of the runner, thus constituting a lining therefor, which prevents middlings or other fine grain product from clinging in and obstructing the eye of the runner.

What I claim is—

As the improvement in force-feed apparatus herein described, the combination, with the hopper and runner, of the feed-tube having lateral discharge-openings, the damsel or spirally-flanged shaft, and the ribbed cone, for operating as specified.

DAVID P. SULOUFF.

Witnesses:
 D. ERNEST LAUTZ,
 W. S. M'COHAN.